(12) United States Patent
Naruse

(10) Patent No.: US 7,072,662 B2
(45) Date of Patent: Jul. 4, 2006

(54) DATA COMMUNICATION QUALITY CONTROL SYSTEM, TRANSMITTER SYSTEM AND RECEIVER

(75) Inventor: Tetsuya Naruse, Chiba (JP)

(73) Assignee: Sony Corporation, Tokyo (JP)

( * ) Notice: Subject to any disclaimer, the term of this patent is extended or adjusted under 35 U.S.C. 154(b) by 448 days.

(21) Appl. No.: 10/149,993

(22) PCT Filed: Oct. 12, 2001

(86) PCT No.: PCT/JP01/08996

§ 371 (c)(1),
(2), (4) Date: Jun. 11, 2002

(87) PCT Pub. No.: WO02/32083

PCT Pub. Date: Apr. 18, 2002

(65) Prior Publication Data

US 2002/0183026 A1   Dec. 5, 2002

Related U.S. Application Data

(60) Provisional application No. 60/240,182, filed on Oct. 13, 2000.

(51) Int. Cl.
*H04Q 7/20* (2006.01)

(52) U.S. Cl. ........... 455/452.2; 455/453; 455/135; 370/235; 370/232

(58) Field of Classification Search ........... 455/134, 455/135, 452.2, 464, 453, 277.2, 61, 62, 455/422.1, 450, 455, 456.2, 456.4, 456.6, 455/575.1, 550.1, 507, 517, 179.1, 63.1, 455/278.1, 67.11, 524, 525, 424, 425, 561, 455/456.5, 166.2, 412.1; 370/235, 232, 412, 370/465, 468, 522, 85.1, 477, 85.2, 85.4, 370/201, 310, 252, 278, 229, 231; 375/240.02–240.04, 375/240.23, 341, 225, 224, 340, 227; 340/825.16, 340/825.5; 709/230

See application file for complete search history.

(56) References Cited

U.S. PATENT DOCUMENTS

| | | | |
|---|---|---|---|
| 5,577,087 A * | 11/1996 | Furuya | 375/377 |
| 6,381,445 B1 * | 4/2002 | Ue et al. | 455/69 |
| 6,400,699 B1 * | 6/2002 | Airy et al. | 370/329 |
| 6,542,736 B1 * | 4/2003 | Parkvall et al. | 455/452.2 |
| 6,847,629 B1 * | 1/2005 | Razoumov et al. | 370/349 |
| 6,952,454 B1 * | 10/2005 | Jalali et al. | 375/260 |
| 2001/0050900 A1 * | 12/2001 | Lee et al. | 370/232 |

FOREIGN PATENT DOCUMENTS

EP   0 964 541   12/1999

(Continued)

OTHER PUBLICATIONS

Vandalore V. et al: 'AquaFWin: Adaptive QoS Framework for Multimedia in Wireless Networks and its Comparison with other QoS Frameworks' Proceedings of the 24th IEEE Conference on Local Computer Networks (LCN'99), Oct. 17-20, 1999, Boston, Ma, pp. 88-97.

(Continued)

*Primary Examiner*—Edward F. Urban
*Assistant Examiner*—Charles Chow
(74) *Attorney, Agent, or Firm*—Frommer Lawrence & Haug LLP; William S. Frommer; Paul A. Levy

(57) ABSTRACT

To insure the communication quality best suited to the type of data between the transmission system and the receiver. In a wireless communication system for controlling the data communication quality between the transmission system and a mobile wireless terminal via a predetermined communication path. The transmission system changes the modulation system in the data output unit corresponding to the type of contents to be transmitted to the mobile wireless terminal to control the data communication quality.

7 Claims, 11 Drawing Sheets

FOREIGN PATENT DOCUMENTS

| | | |
|---|---|---|
| EP | 0964541 | 12/1999 |
| GB | 2338383 | 12/1999 |
| JP | 5-328083 | 12/1993 |
| JP | 5-328084 | 12/1993 |
| JP | 7-170290 | 7/1995 |
| JP | 11-98128 | 4/1999 |
| JP | 11-187367 | 7/1999 |
| JP | 11-355263 | 12/1999 |
| JP | 11-355854 | 12/1999 |
| JP | 2000-174693 | 6/2000 |
| TW | 388150 | 4/1989 |
| WO | WO 99 12304 | 3/1999 |

OTHER PUBLICATIONS

Van Der Scharr M. et al: 'Scalable MPEG-4 Video Coding with Graceful Packet-loss Resilience over Bandwidth-varying Networks' ICME 2000, vol. 3, pp. 1487-1490, 2000.

Novell M: et al: 'Error Resilient Variable Length Encoder/Decoder for Low Power Wireless Video Codecs'. Proceedings of the IEEE Midwest Symposium on Circuits and Systems, Las Cruces, NM, Aug. 1999, vol. 2, pp. 1086-1089.

* cited by examiner

DATA COMMUNICATION QUALITY CONTROL SYSTEM, TRANSMITTER SYSTEM AND RECEIVER

This application claims priority to provisional application 60/240,182 filed on Oct. 13, 2000 and the disclosure of that application is incorporated herein by reference to the extent permitted by law.

TECHNICAL FIELD

The present invention relates to a data communication quality control system, a transmission system and a receiver and is suitably applied to a wireless communication system comprising a base station for transmitting contents data such as images or audio via a server, and a mobile wireless terminal for receiving contents data from said base station.

BACKGROUND ART

Heretofore, in the wireless communication system comprises a base station and a mobile wireless terminal, the wireless communication channel is established between the base station and mobile wireless terminal, and the data communication for various application data such as sound, text or images are to be executed via said wireless communication channel.

Furthermore, in the wireless communication system, the volume of communications is not fixed since transmission condition varies from moment to moment due to various effects in the wireless communication path between the base station and the mobile wireless terminal. Accordingly, the wireless communication system transmits the application data from the base station at the fixed transmission speed set by said base station so that the bit error rate of the data to be transmitted becomes lower than the predetermined rate.

However, in the wireless communication system thus constructed, the application data is transmitted from the base station to the mobile wireless terminal at the transmission speed just to make the bit error rate lower than the fixed rate. And this does not cope with the case where the reliability of data is required although the transmission speed is low according to the type of application data or the case where the high transmission speed is required although the reliability of data is somewhat low. And this could not necessarily be said that it was offering the communication quality that the user desired.

DISCRIPTION OF THE INVENTION

The present invention has been done considering the above points and is proposing a data communication quality control system, a transmission system and a receiver capable of assuring the optimum communication quality suited to the type of data.

To obviate such problems according to the present invention, in the data communication quality control system to control the data communication quality between the transmission system to transmit data and the receiver to receive the data from said transmission system via the predetermined communication path, since the transmission system changes the modulation system corresponding to the type of data to be transmitted to the receiver, the data communication quality between said transmission system and the receiver will be controlled.

With this arrangement, the data transmission can be executed from the transmission system to the receiver holding the predetermined data communication quality according to the modulation system best suited to the type of data.

Furthermore, in the data communication quality control system to control the data communication quality between the transmission system for transmitting data and the receiver for receiving data from said transmission system via the predetermined communication path, since the transmission system adjusts the volume of data storage of the transmitting side that temporarily conducts buffering when sending said data to the receiver corresponding to the type of data to be sent to the receiver, and the receiver adjusts the data received from the transmitter, i.e., adjusts the data storage volume of the receiving side that temporarily conducts buffering to the same data storage volume as the data storage volume of the transmitting side, the data communication quality between said transmission system and the receiver will be controlled.

Thus, since the data can be read out at the optimum data readout timing corresponding to the type of data by the receiver and can be decoded, the data transmission can be effectively conducted holding the data communication quality best suited to the type of data and not generating underflow or overflow from the transmission system to the receiver.

Furthermore, according to the present invention, in the data communication quality control system to control the data communication quality between the transmission system to transmit data and the receiver to receive data from said transmission system through the predetermined communication path, since the transmission system adjusts the number of retransmissions when transmitting said data to the receiver corresponding to the type of data to be transmitted to the receiver, the data communication quality between said transmission system and the receiver will be controlled.

With this arrangement, the data transmission from the transmission system to the receiver can be conducted holding the predetermined data communication quality according to the number of retransmissions best suited to the type of data.

BEST MODE FOR CARRYING OUT THE INVENTION

The present invention will be described in detail with reference to the accompanying drawings.

(1) General Construction of Wireless Communication System

Figure 1:
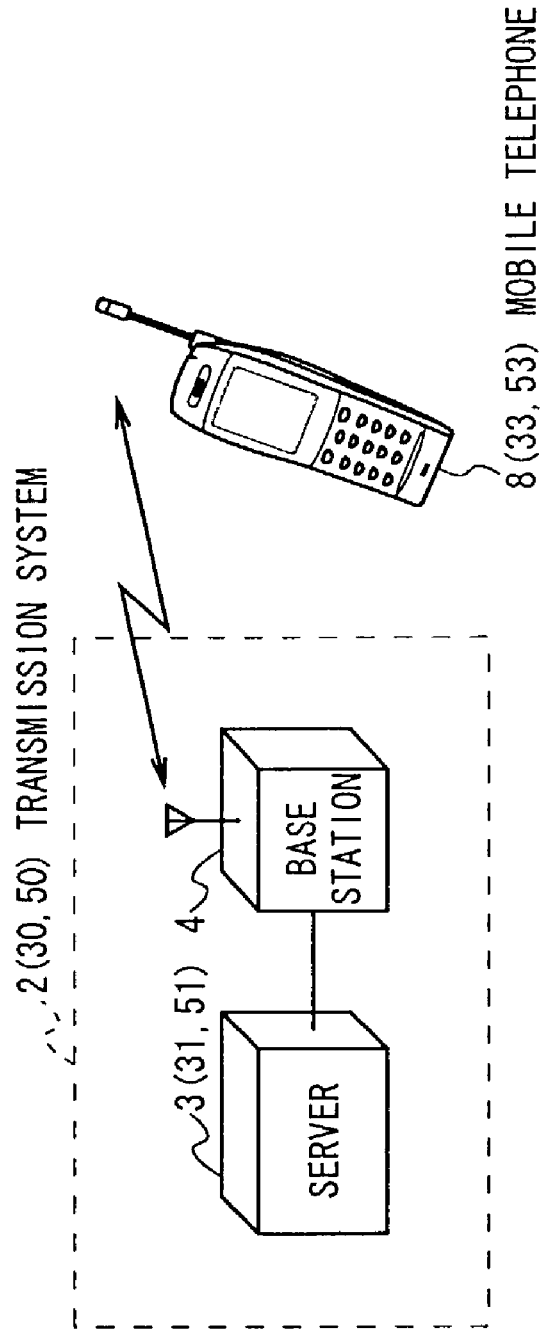
FIG. 1 is a schematic diagram showing the general construction of a wireless communication system according to one embodiment of the present invention.

In FIG. 1, 1 generally shows a wireless communication system as a data communication quality control system according to the present invention. And this comprises a transmission system 2 to transmit contents and a mobile wireless terminal 8 to receive contents from said transmission system 2 as a receiver and display this.

The transmission system comprises a server 3 for providing contents and a base station 4 for transmitting the contents supplied from said server 3 to the mobile wireless terminals 8, and the communication quality between the base station 4 and the mobile wireless terminal 8 can be controlled by said server 3.

The mobile wireless terminal 8 is a mobile telephone in the cellular system and establishing the wireless channel with the base station 4 within the domain of cell in which said mobile wireless terminal 8 itself exists, receives contents from the server 3 through said base station 4.

Figure 2:
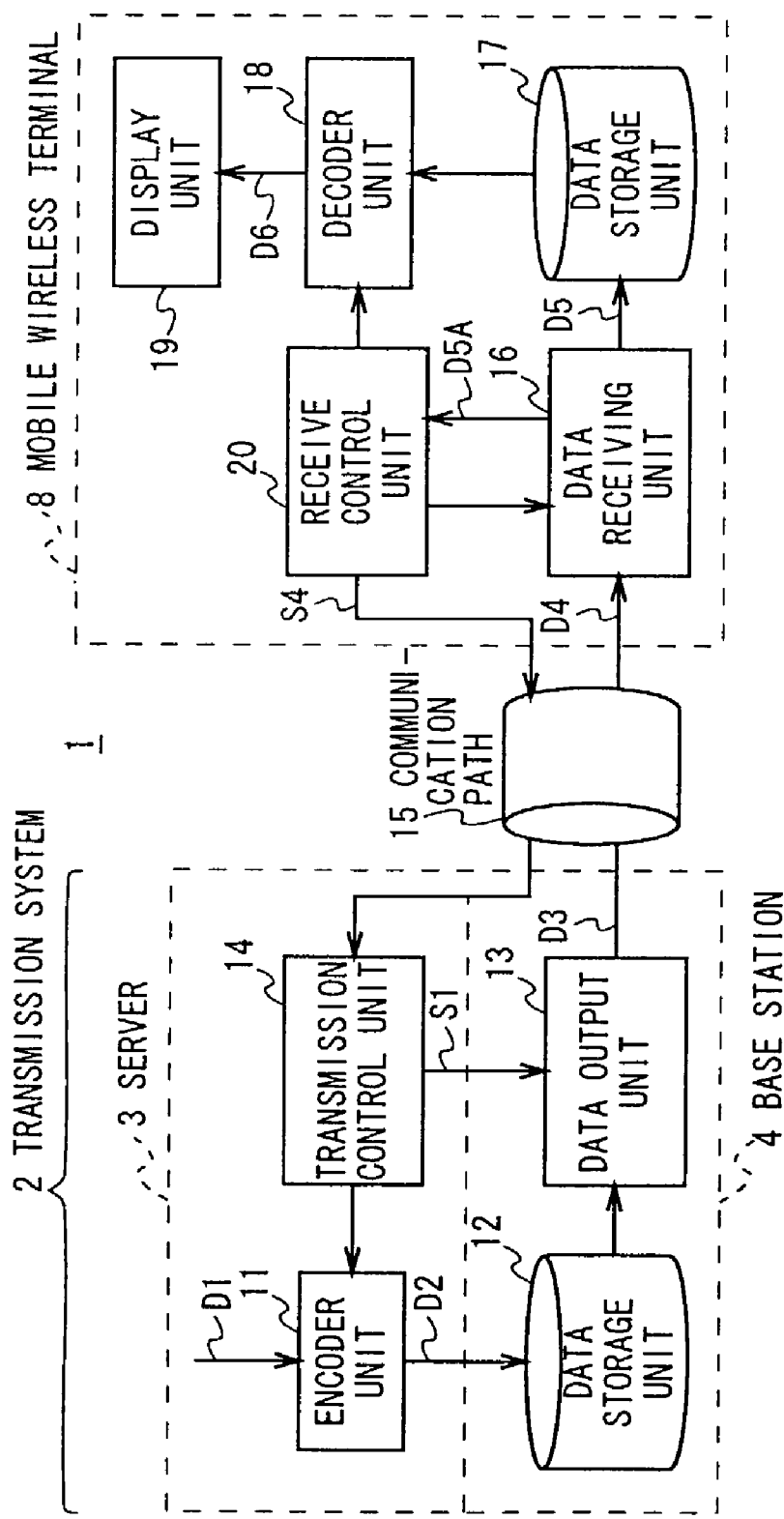
FIG. 2 is a brief linear block diagram showing the circuit construction of a wireless communication system according to the first embodiment.

(2) The First Embodiment (2-1) Circuit Construction of Wireless Communication System As shown in FIG. 2, firstly the server 3 enters contents data D1 of the contents to be transmitted (such as moving picture, still picture, text or audio) into an encoder unit 11, and by compression encoding the contents data D1 at the predetermened compression rate designated by the transmission control unit 14 comprised of microprocessor forms coded data D2, supplies this to the data storage unit 12 of the base station 4.

The base station 4, after temporarily storing the coded data D2 supplied from the encoder unit 11 of the server 3 in the data storage unit 12, sends this out to the data transmission unit 13 as the system side transmission means.

The data transmission unit 13, adding an error correction code to the coded data D2, packetizes this, and modulating this corresponding to the control signal S1 from the transmission control unit 14 of the server 3, forms a transmission data D3 and transmits this to the mobile wireless terminal 8 via the communication path 15.

The mobile wireless terminal 8 receives the transmission data D3 by the data receiving unit 16 as the receiver side receiving means. And conducting the demodulation processing and error correction processing making this as received data D4, it obtains a demodulation data D5, and after storing this in the data storage unit 17, sends this out to the decoder unit 18.

At this point, the data receiving unit 16, detecting the pilot signal contained in said modulation data D5, calculates CIR (Carrier Interference Ratio) in the received data D4, and transmits this to the receive control unit 20 comprised of microprocessor as a calculation result data D5A of the CIR.

The receive control unit 20 monitors the data storage volume to be stored in the data storage unit 17 from the data receiving unit 16. And at the time when the volume of data that can be decoded in the decoder unit 18 is stored, the receive control unit 20 informs the decoding timing to said decoder unit 18.

The decoder unit 18 decodes the demodulattion data D5 responding to the decoding timing notice from the receive control unit 20, and outputs the resultant decoded data D6 to the display unit 19, and by displaying its contents via said display unit 19, it makes the user view and hear.

Figure 3:
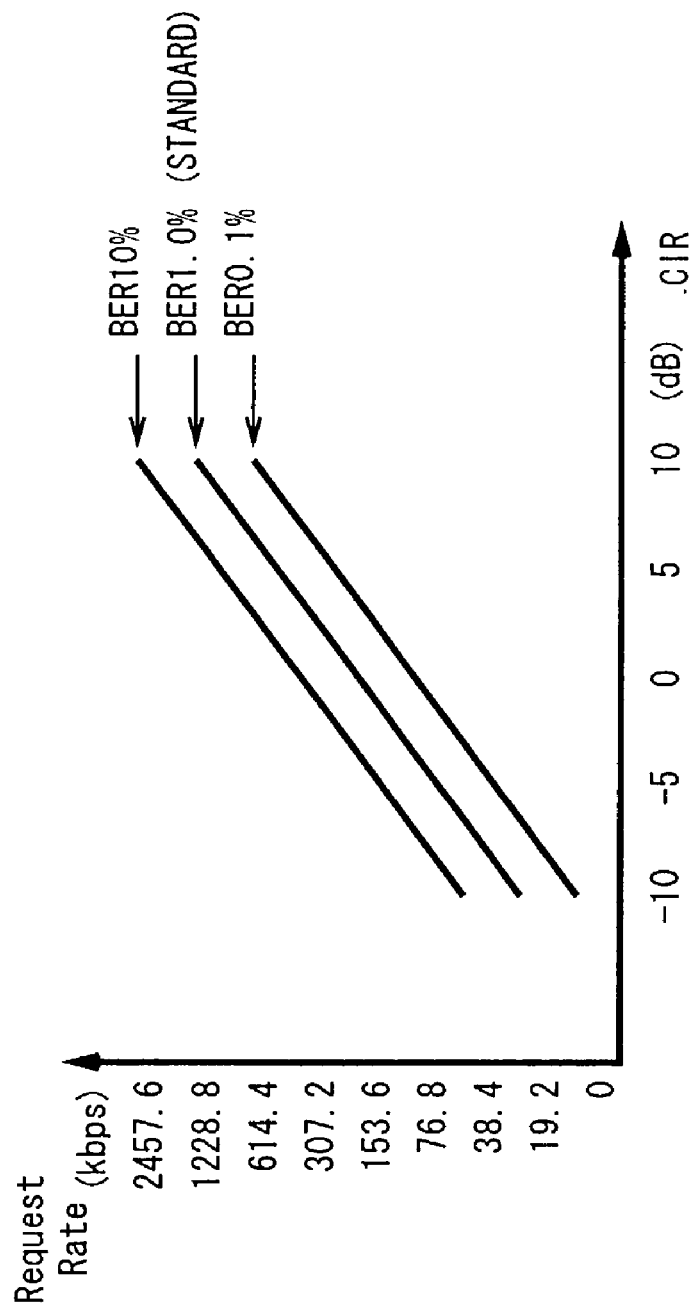
FIG. 3 is a characteristic curvilinear diagram showing the relationship between the CIR and the transmission speed.

As shown in FIG. 3, when the user wants to limit the bit error rate of the receive data D4 received via the communication path 15 to "1.0"% (standard) for example, the relationship between the CIR and the transmission speed (kbps) can be calculated according to the predetermined algorithm as shown in the bar graph.

In this case, when CIR is 0 [dB], if the data receiving unit 16 of the mobile wireless terminal 8 receives the transmission data S3 transmitted at the transmission speed of 153.6 [kbps] through the communication path 15, it is considered that the bit error rate of the receive data D4 can be controlled lower than "1.0"% (standard).

More specifically, in order to limit the bit error rate to lower than "1.0"% (standard) it is necessary to use the modulation system of low transmission speed as the CIR becomes lower in the transmission system 2 side, and it is necessary to use the modulation system of high transmission speed as the CIR becomes higher.

In the case of limiting the bit error rate to lower than "10"% or "0.1"%, it has the same relation as those of the above. However, in that case the difference occurs either the transmission speed required generally becomes higher or lower as compared with the case of limiting the bit error rate to lower than "1.0"% (standard).

The receive control unit 20 determines whether the bit error rate "1.0" (standard) may be remained as it is corresponding to the type of contents (such as moving picture, still picture, text or audio) to request to the transmission system 2, or high transmission speed is required although the bit error rate may be remained lower than "10"%, or high transmission speed is not required although high reliability of "0.1"% bit error rate is needed as occasion demands.

Then, the receive control unit 20 as the receiver side transmission means determines new transmission speed corrected corresponding to the bit error rate determined (such as, when the CIR is 0 [dB] and it wants to limit the bit error rate to lower than "10"%, it determines to 307.2 [kbps], or when the CIR is 0 [dB] and wants to limit the bit error rate to less than "0.1"%, it determines 76.8 [kbps]) and making this as the corrected transmission speed it transmits a request signal S4 to the transmission control unit 14 as the control means in the server 3 and the system side transmission means.

The transmission control unit 14 of the server 3 selects the modulation system transmittable at the corrected transmission speed (such as BPSK (Binary Phase Shift Keying), QPSK (Quadrature Phase Shift Keying), 16QAM (Quadrature Amplitude Modulation) or 64QAM) requested by the request signal S4 from the receive control unit 20 of the mobile wireless terminal 8 as occasion demands, and by sending out the control signal S1 showing its modulation system to the data output unit 13 of the base station 4, it can greatly improve the communication quality in the transmission path 15 satisfying the transmission speed and the bit error rate corresponding to the type of contents.

Figure 4:
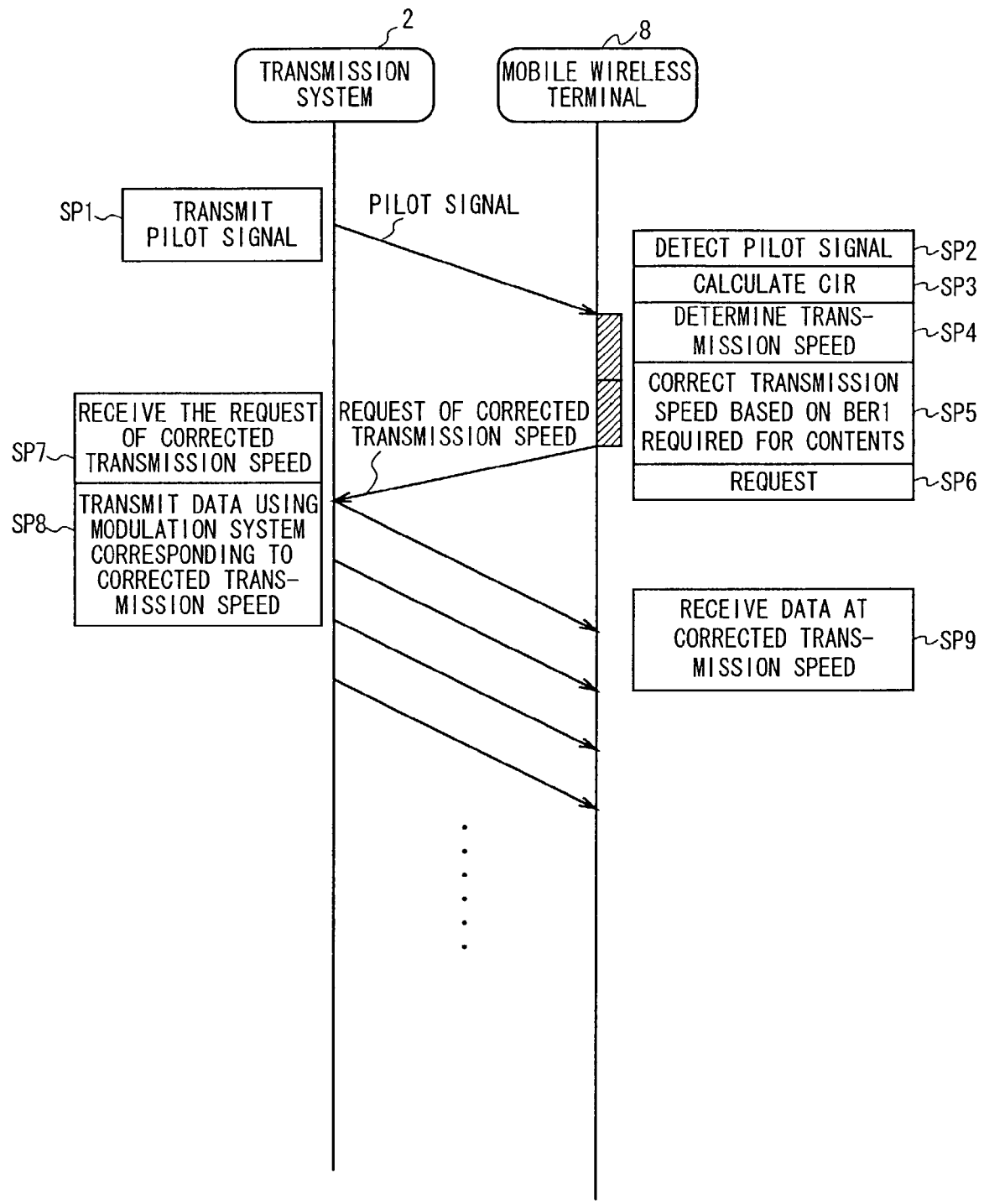
FIG. 4 is a flow chart showing the modulation control processing procedure corresponding to the type of contents by the mobile wireless terminal.

(2-2) Modulation Control Processing Procedure Corresponding to the Type of Contents by Mobile Wireless Terminal More specifically, in the wireless communication system 1, the modulation control processing will be conducted between the transmission system 2 and the mobile wireless terminal 8 according to the procedure as shown in FIG. 4.

Firstly, at the step SP1, the base station 4 of the transmission system 2 transmits the transmission data D3 in which pilot signal is contained to the mobile wireless terminal 8 by using the data output unit 13, and moves to the following step SP2.

At the step SP2, the mobile wireless terminal 8, after detecting the pilot signal in the receive data D4 received at the data receiving unit 16, calculates the CIR in said received data D4 based on the pilot signal at the following step SP3.

At the step SP4, the mobile wireless terminal 8 calculates the transmission speed in order to control the bit error rate lower than "1.0"% (standard) according to the relation between the CIR and the transmission speed shown in FIG. 3 by the receive control unit 20 and moves to the following step SP5.

At the step SP5, the mobile wireless terminal 8 determines whether to keep the bit error rate "1.0"% as it is corresponding to the type of contents (moving picture data, text data or audio data) to be requested from the receive control unit 20 to the server 31, or keep it lower than "10"% and require the high transmission speed, or making the bit error rate to lower than "0.1"%, require the high reliability as occasion demands, and corrects the transmission speed based on the determined bit error rate and the CIR.

At the step SP6, the mobile wireless terminal 8 requests the corrected transmission speed to the transmission control unit 14 of the server 3 from the receive control unit 20, and moves to the following step SP7.

At the step SP7, the transmission control unit 14 of the server 3 receives the request relative to the corrected transmission speed from the mobile wireless terminal 8.

At the step SP8, the transmission control unit 14 of the server 3 determines the modulation system transmittable at the corrected transmission speed. Then, by outputting the control signal S1 showing that modulation system to the data output unit 13 of the base station 4, the transmission control unit 14 transmits the transmission data D3 from the base station 4 to the mobile wireless terminal 8.

At the step SP9, receiving the transmission data D3 transmitted from the base station 4 at the corrected transmission speed in the data receiving unit 16, the mobile wireless terminal 8 can obtain the receive data D4 that satisfies the optimum bit error rate suited to the type of contents.

Figure 5:
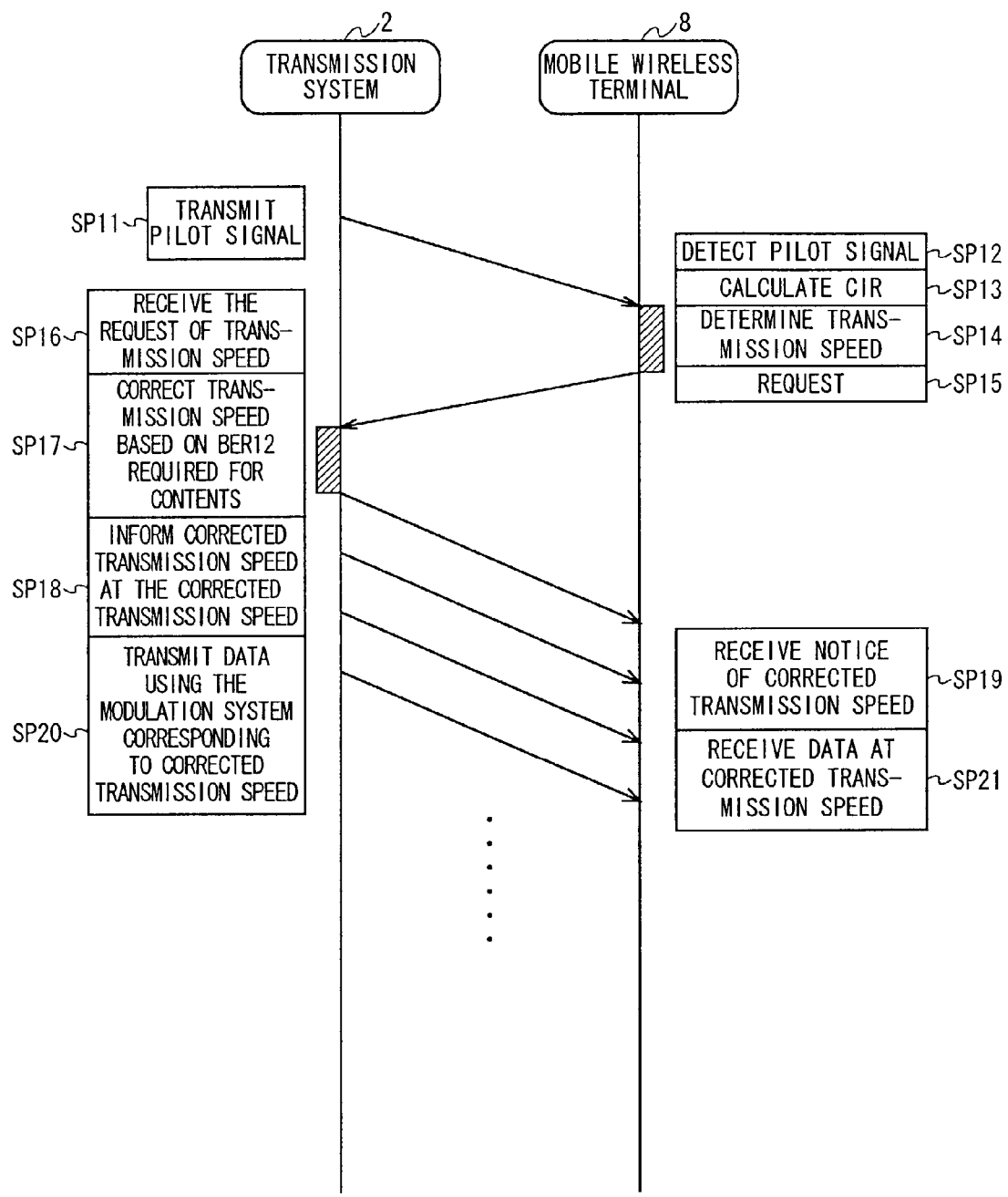
FIG. 5 is a flow chart showing the modulation control processing procedure corresponding to the type of contents by the transmission system.

(2-3) Modulation Control Processing Procedure Corresponding to the Type of Contents by Transmission System On the other hand, in the wireless communication system 1, it is also possible that the modulation control processing between the transmission system 2 and the mobile wireless terminal 8 would be executed by the control of the transmission system 2 side as shown in FIG. 5.

Firstly, at the step SP11, the base station 4 of the transmission system 2 transmits the transmission data D3 in which the pilot signal is contained to the mobile wireless terminal 8 by the data output unit 13, and moves to the following step SP12.

At the step SP12, after detecting the pilot signal in the received data D4 by the data receiving unit 16, the mobile wireless terminal 8 calculates the CIR in said received data D4 based on the pilot signal at the following step SP13, and informs this to the receive control unit 20.

At the step SP14, the mobile wireless terminal 8 calculates the transmission speed to limit the bit error rate to lower than "1.0"% (standard) according to the relation between the CIR and the transmission speed by the receive control unit 20, and moves to the following step SP15.

At the step SP15, the mobile wireless terminal 8 requests the transmission speed to limit the bit error rate to lower than "1.0"% to the transmission control unit 14 of the server 3 from the receive control unit 20, and moves to the following step SP16.

At the step SP16, the transmission control unit 14 of the server 3 receives the request for the transmission speed from the mobile wireless terminal 8.

At the step SP17, the transmission control unit 14 of the server 3 determines whether the bit error rate of "1.0"% would be kept as it is as required from the mobile wireless terminal 8 corresponding to the type of contents (moving picture data, text data or audio data) requested from the mobile wireless terminal 8, or whether to make the bit error rate lower than "10"% and the high transmission speed is needed, or making the bit error rate to lower than "0.1"% and the high reliability is needed instead of high transmission speed, and it corrects the transmission speed based on the determined bit error rate and the CIR.

At the step SP18, the transmission control unit 14 of the server 3 determines the modulation system that can be transmitted at the corrected transmission speed, and outputting the control signal S1 showing that modulation system to the data output unit 13 of the base station 4, informs the corrected transmission speed determined to the mobile wireless terminal 8 from the base station 4 at that corrected transmission speed.

At the step SP19, the receive control unit 20 of the mobile wireless terminal 8, receiving the notification of corrected transmission speed, assumes the modulation system in the data output unit 13 of the base station 4 based on that corrected transmission speed, and conducts the preparation for demodulation processing by using the modulation system corresponding to said modulation system assumed.

At the step SP20, the transmission control unit 14 of the server 20 determines the modulation system that can be transmitted at the corrected transmission speed. And by outputting the control signal S1 showing that modulation system to the data output unit 13, it transmits the transmission data D3 to the mobile wireless terminal 8 from the base station 4 at the corrected transmission speed.

At the step SP21, the mobile wireless terminal 8, by receiving the transmission data D3 transmitted from the base station 4 at the corrected transmission speed in the data receiving unit 16, it can obtain the receive data D4 that can satisfy the optimum bit error rate suited to the type of contents.

(2-4) Operation and Effects

According to the foregoing construction, in the wireless communication system 1, the CIR in the receive data D4 will be calculated based on the pilot signal in the receive data D4 received at the data receiving unit 16 of the mobile wireless terminal 8. And the transmission speed will be determined to control the bit error rate lower than "1.0"% according to the relation between said CIR and the transmission speed.

Then, in the wireless communication system 1, the bit error rate will be determined by the mobile wireless terminal 8 or the transmission system either to "1.0"%, "10"% or "0.1"% and the transmission speed will be corrected based on that determined bit error rate and the CIR.

Then next, in the wireless communication system 1, the transmission control unit 14 of the server 3 determines the modulation system transmittable at the corrected transmission speed, and outputs the control signal S1 showing that modulation system to the data output unit 13 of the base station 4, and transmits the transmission data D3 from the base station 4 to the mobile wireless terminal 8 at the corrected transmission speed.

With this arrangement, the mobile wireless terminal 8 can receive the transmission data D3 having the transmission speed corrected corresponding to the type of contents from the base station 4. And thus, the mobile wireless terminal 8 can obtain the receive data D4 that satisfies the communication quality (bit error rate) required for the type of contents.

(3) The Second Embodiment

As shown in FIG. 1, the wireless communication system 20 comprise a transmission system 30 having a server 31 and a base station 4, and a mobile wireless terminal 33.

(3-1) Circuit Construction of Wireless Communication System

Figure 6:
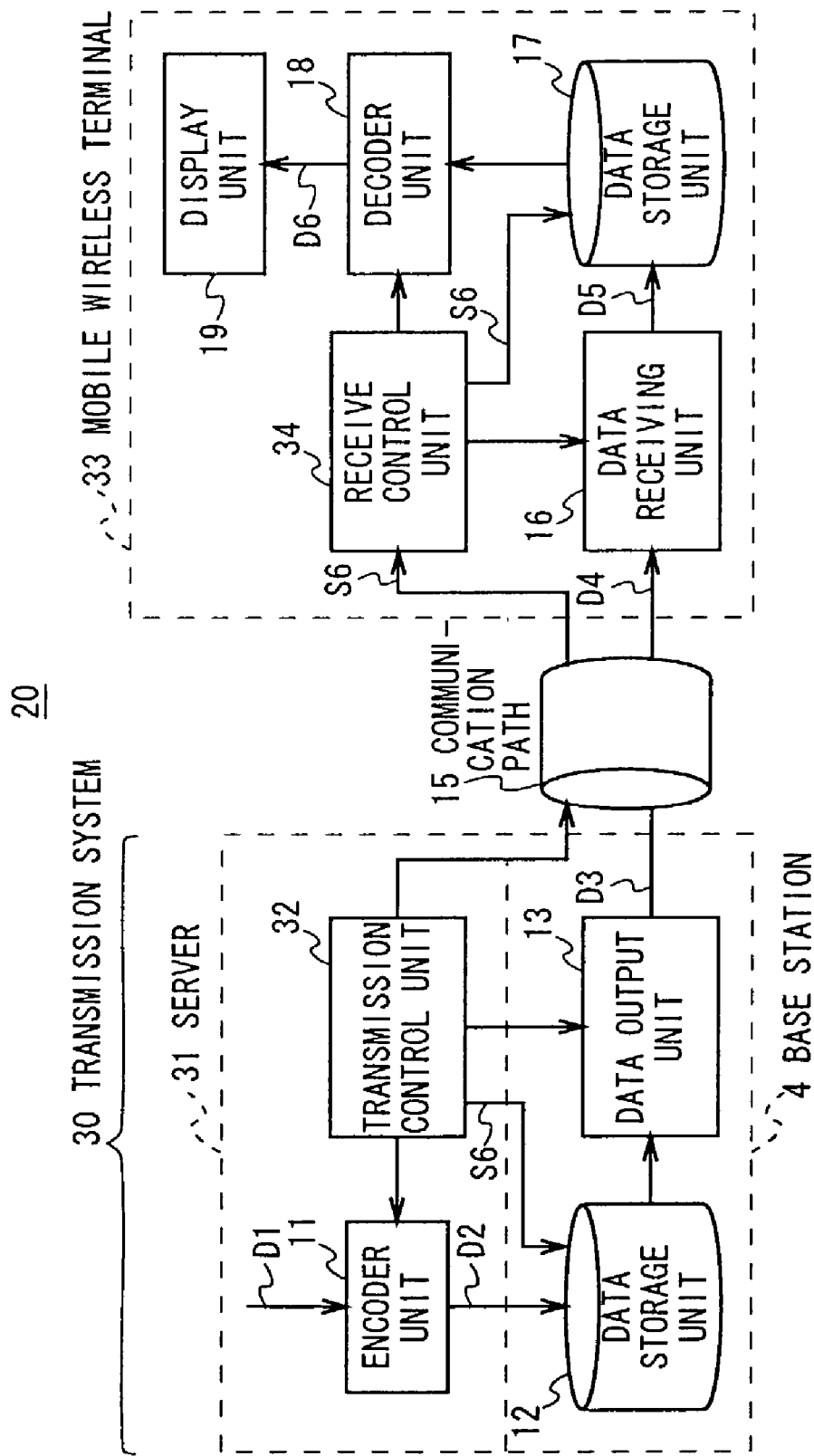
FIG. 6 is a brief linear block diagram showing the circuit construction of a wireless communication system according to the second embodiment.

In FIG. 6, in which corresponding parts of FIG. 2 are designed the same reference numerals, the server 31 of the transmission system 30 enters a content data D1 of the contents (such as moving picture, still picture, text or audio) to be transmitted into an encoder unit 11. And by compression encoding the contents data D1 at the predetermined compression rate specified by the transmission control unit 32, it forms a coded data D2, and supplies this to the data storage unit 12 of the base station 4.

The base station 4, after storing the coded data D2 supplied from the encoder unit 11 of the server 31 in the data storage unit 12 temporarily, transmits this to the data output unit 13. The data output unit 13, as well as adding error correction code to the coded data D2, packetizes this, and modulating this by the predetermined modulation system, forms a transmission data D3, and transmits this to the mobile wireless terminal 33 via the communication path 15.

The mobile wireless terminal 33 receives the transmission data D3 by the data receiving unit 16, and by conducting the demodulation processing and the error correction processing on this as the receive data D4, obtains a demodulation data D5, and after storing this in the data storage unit 17 temporarily, it outputs this to the decoder unit 18.

Incidentally, the receive control unit 34 monitors the volume of data storage to be stored in the data storage unit 17 from the data receiving unit 16. And when the data volume that can be decoded in the decoder unit 18 is stored, the receive control unit 34 informs the decoding timing to said decoder unit 18.

The decoder unit 18 decodes the demodulation data D5 according to the decoding timing notice from the receive control unit 20, and outputs the resulting decoded data D6 to the display unit 19, and displaying contents of the data via said display unit 19, it can make the user view and hear.

By the way, the transmission control unit 32 of the server 31 can control the volume of data storage of the coded data D2 to be stored in the data storage unit 12 of the base station 4. And simultaneously, the transmission control unit 32 can control the volume of data storage of the demodulation data D5 in the data storage unit 17 of the mobile wireless terminal 33 interlocking to said data storage unit 12.

Figure 7:
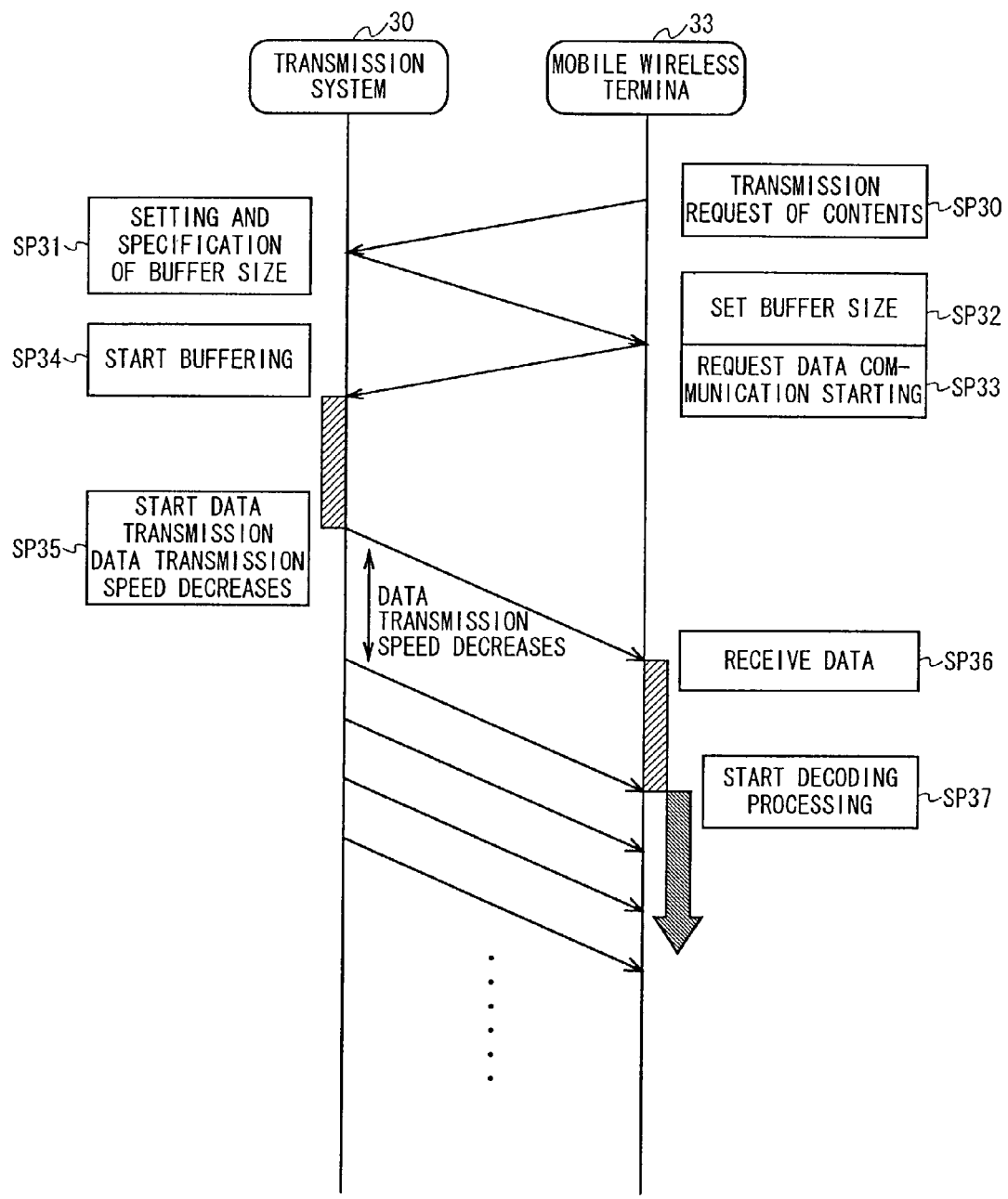
FIG. 7 is a flow chart showing the buffer size control processing procedure corresponding to the type of contents.

(3-2) Buffer Size Control Processing Procedure Corresponding to the Type of Contents More specifically, in the wireless communication system 20 the buffer size control processing onto the data storage unit 12 and the data storage unit 17 will be conducted between the transmission system 30 and the mobile wireless terminal 33 according to the procedure as shown in FIG. 7.

Firstly, at the step SP30, the mobile wireless terminal 33 requests the type of contents to the transmission control unit 32 in the server 31 of the transmission system 30 from the receive control unit 20.

At the step SP31, the transmission control unit 32 of the server 31, by sending a buffer size setting signal S6 to the data storage unit 12, sets the data storage volume (buffer size) of the coded data D2 to the data storage unit 12. And simultaneously, it designates the same data storage volume as that of the data storage unit 12 to the data storage unit 17 by transmitting said buffer size setting signal S6 to the receive control unit 34 of the mobile wireless terminal 33.

At the step SP32, the mobile wireless terminal 33, by outputting the buffer size setting signal S6 to the data storage unit 17 from the receive control unit 34, sets the data storage volume (buffer size) in the case of storing the demodulation data D5 demodulated at the data receiving unit 16 into the data storage unit 17 similar to that of the data storage unit 12, and it moves to the following step SP33.

At this point, since the physical maximum data storage volume in the data storage unit 12 and the data storage unit 17 has been determined, the setting of data storage volume (buffer size) means here that the setting of usage pattern regarding write-in or read-out of the data storage unit 12 and the data storage unit 17.

At the step SP33, since the mobile wireless terminal 8 set the buffer size of the data storage unit 17 according to the specification from the server 31, it requests starting of the data communication of contents to the server 31 via the base station 4 by the receive control unit 34.

At the step SP34, the base station 4 starts the buffering to the data storage unit 12 of the coded data D2 supplied from the encoder unit 11 of the server 31 and moves to the next step SP35.

At the step SP35, in the case of reading out the coded data D2 from the data storage unit 12 by the data output unit 13, the base station 4 reads this out at the time when the coded data D2 for the data storage volume set based on the buffer size setting signal S6 is stored, and it starts the data transmission of the transmission data D3 after applying the modulation processing.

At the step SP36, the mobile wireless terminal 33 receives the transmission data D3 from the base station 4 as the receive data D4 from the data receiving unit 16, and moves to the following step SP37.

The mobile wireless terminal 33 of the step SP37 reads out the demodulation data D5 at the read-out timing supposing that the demodulation data D5 for the fixed data storage volume may be stored in the data storage unit 17 according to the buffer size specified from the server 31 and starts the decoding processing by the decoder unit 18.

Figure 8:
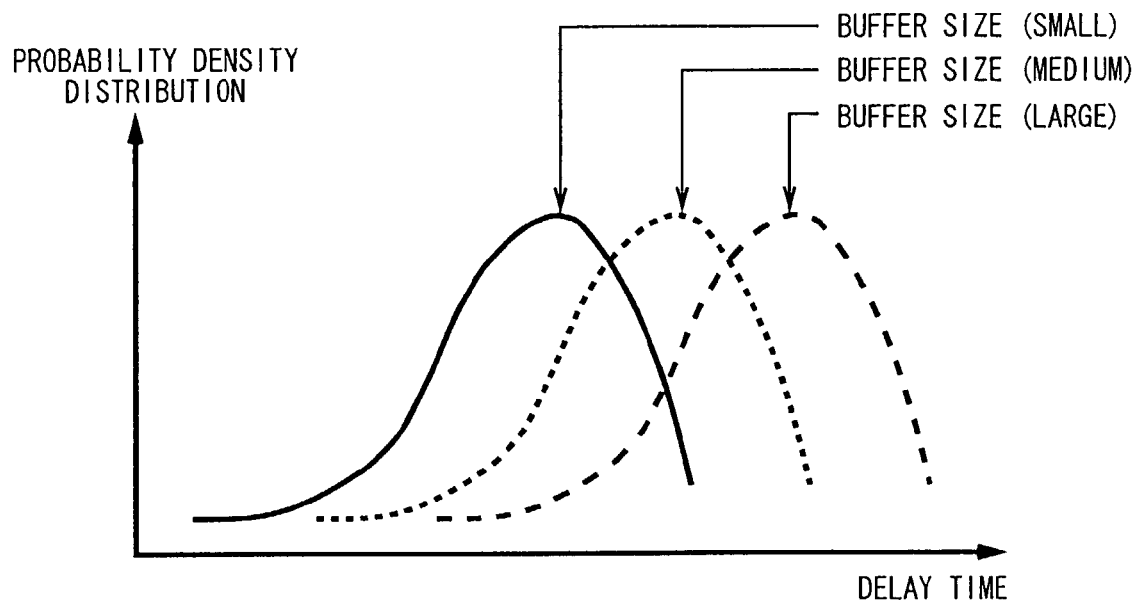
FIG. 8 is a characteristic curvilinear diagram showing the relationship between the buffer size and the relay time.

At this point, as shown in FIG. 8, the relationship between the buffer sizes (large, middle, small) in the case where the data storage volumes (buffer sizes) of the data storage unit 12 and the data storage unit 17 are optionally set according to the buffer size setting signal S6 and the delay time of the transmission data D3 will be shown in Figure.

More specifically, in the relation between the buffer size and the delay time, the probability that delay will occur when transmitting the data to the mobile wireless terminal 33 from the transmission system 30 is expressed in the delay time basis. Thus, it is clear from this Figure, when the large buffer size is set, it takes long time to read out the coded data D2 after storing this. And if the small buffer size is set, it takes short time to read out the coded data D2 after storing this.

Figure 9:
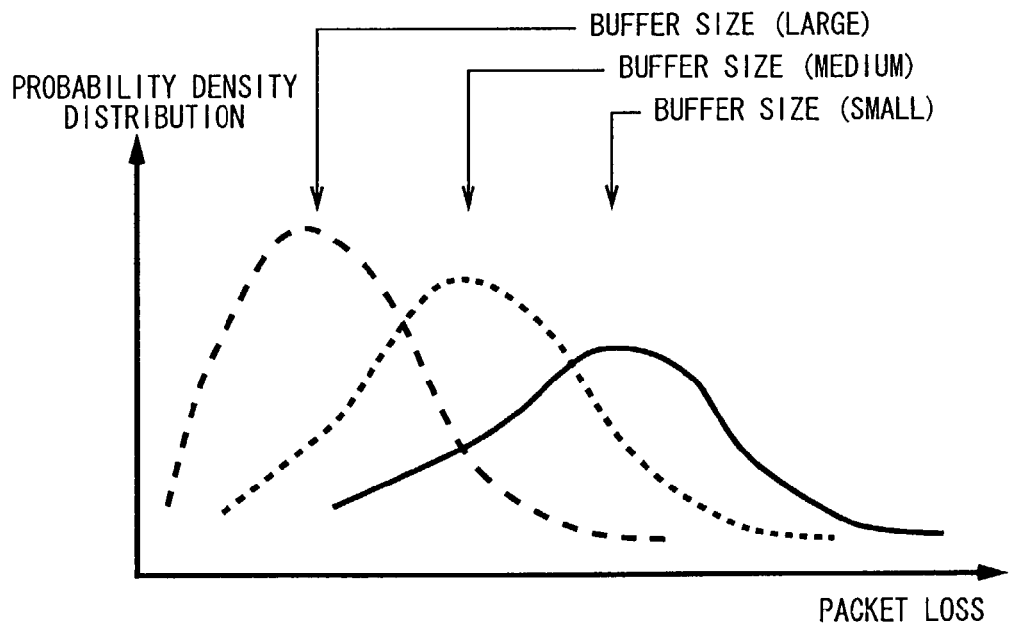
FIG. 9 is a characteristic curvilinear diagram showing the relationship between the buffer size and the packet loss.

Furthermore, as shown in FIG. 9, regarding the relation between the buffer sizes (large, middle, small) and the packet loss, the probability of ratio of packet loss will occur is expressed per ratio. And it is clear from this Figure that as the buffer size becomes smaller, the probability that the packet will occur becomes higher, and as the buffer size becomes larger, the probability that the packet loss will occur becomes lower.

This is caused by the fact that the data read-out timing from the data storage unit 12 and the data storage unit 17 would become the same since the transmission control unit 32 of the server 31 has set the buffer sizes of the storage unit 12 of the base station 4 and the data storage unit 17 of the mobile wireless terminal 33 to the same data storage volume.

More specifically, in the case where the buffer sizes of the storage unit 12 in the base station 4 and the data storage unit 17 of the mobile wireless terminal 33 are set larger than the normal standard size, even if the sufficient data volume is not stored in the data storage unit 17 of the mobile wireless terminal 33 caused by the data transmission speed decrease due to worsening of the communication condition in the communication path 15 when the data transmission to the mobile wireless terminal 33 is started from the base station 4 via the communication path 15 (step SP35, step SP36, step SP37), the probability that underflow will occur decreases since the read-out timing for decoding is slow for the portion that the buffer size is set large.

On the other hand, in the case where the buffer sizes of the data storage unit 12 of the base station 4 and the data storage unit 17 of the mobile wireless terminal 33 are set smaller than the normal standard size, if the data transmission speed decreases due to worsening of the communication condition in the communication path 15 and the sufficient volume of data is not stored in the data storage unit 17 of the mobile wireless terminal 33 when the data transmission is started to the mobile wireless terminal 33 from the base station 4 via the communication path 15 (step SP35, step SP36, step SP37), the probability of underflow occurrence becomes high because the read-out timing for decoding is fast for the portion that the buffer size is set small.

Thus, the transmission control unit 32 of the server 31, by controlling the data storage volume for the data storage unit 12 and the data storage volume for the data storage unit 17 of the mobile wireless terminal 33, can adjust the time required from storing the data through reading it out. And thereby the occurrence of underflow will be prevented even when the data transmission speed in the communication path 15 decreases and the decoding error will be further decreased.

(3-3) Operation and Effects

According to the foregoing construction, the transmission control unit 32 of the server 31 optionally sets the buffer size in the data storage unit 12 of the base station 4 and the data storage unit 17 of the mobile wireless terminal 33 corresponding to the type of contents (moving picture data, text data or audio data) requested from the mobile wireless terminal 33 and arranges the time required from the write-in through read-out.

More specifically, if the transmission control unit 32 of the server 31 sets the buffer size in te data storage unit 12 and the data storage unit 17 smaller than the normal standard size, the delay time of the transmission data D3 from the base station 4 to the mobile wireless terminal 33 becomes shorter. However, when the transmission speed decreases due to worsening of the communication condition in the communication path 15, the read-out for decoding would be conducted under the condition in which the demodulation data D5 is not sufficiently stored in the data storage unit 17 of the mobile wireless terminal 33 and there is a possibility of occurrence of the underflow.

On the other hand, if the transmission control unit 32 of the server 31 sets the buffer size in the data storage unit 12 and the data storage unit 17 larger than the normal standard size, the delay time of the transmission data D3 from the base station 4 to the mobile wireless terminal 33 becomes longer. However, even in the case where the transmission speed decreases due to worsening of the communication condition in the communication path 15, the read-out timing becomes slower than the time when the buffer size is set small for that portion. And accordingly, the probability that the underflow will occur can be decreased even if the readout for decoding would be conducted from the data storage unit 17.

Thus, in the case where the data communication having high reliability suited to the type of contents is required, the transmission control unit 32 of the server 31 sets the buffer size in the data storage unit 12 and the data storage unit 17 large. On the other hand, in the case where the high speed communication having short delay time rather than the reliability is required, the transmission control unit 32, setting the buffer size in the data storage unit 12 and the data storage unit 17 small, offers the optimum communication quality best suited to the contents of which the type is specified by the mobile wireless terminal 33.

According to the foregoing construction, by setting the buffer size in the data storage unit 12 of the base station 4 and the data storage unit 17 of the mobile wireless terminal 33 corresponding to the type of contents by the transmission control unit 32 of the server 31, the wireless communication system 20 can provide the optimum communication quality suited to the type of contents to the mobile wireless terminal 33.

(4) The Third Embodiment

As shown in FIG. 1, the wireless communication system 40 comprises a transmission system 50 comprised of a server 51 and a base station 4, and a mobile wireless terminal 53.

(4-1) Circuit Construction of Wireless Communication System

Figure 10:
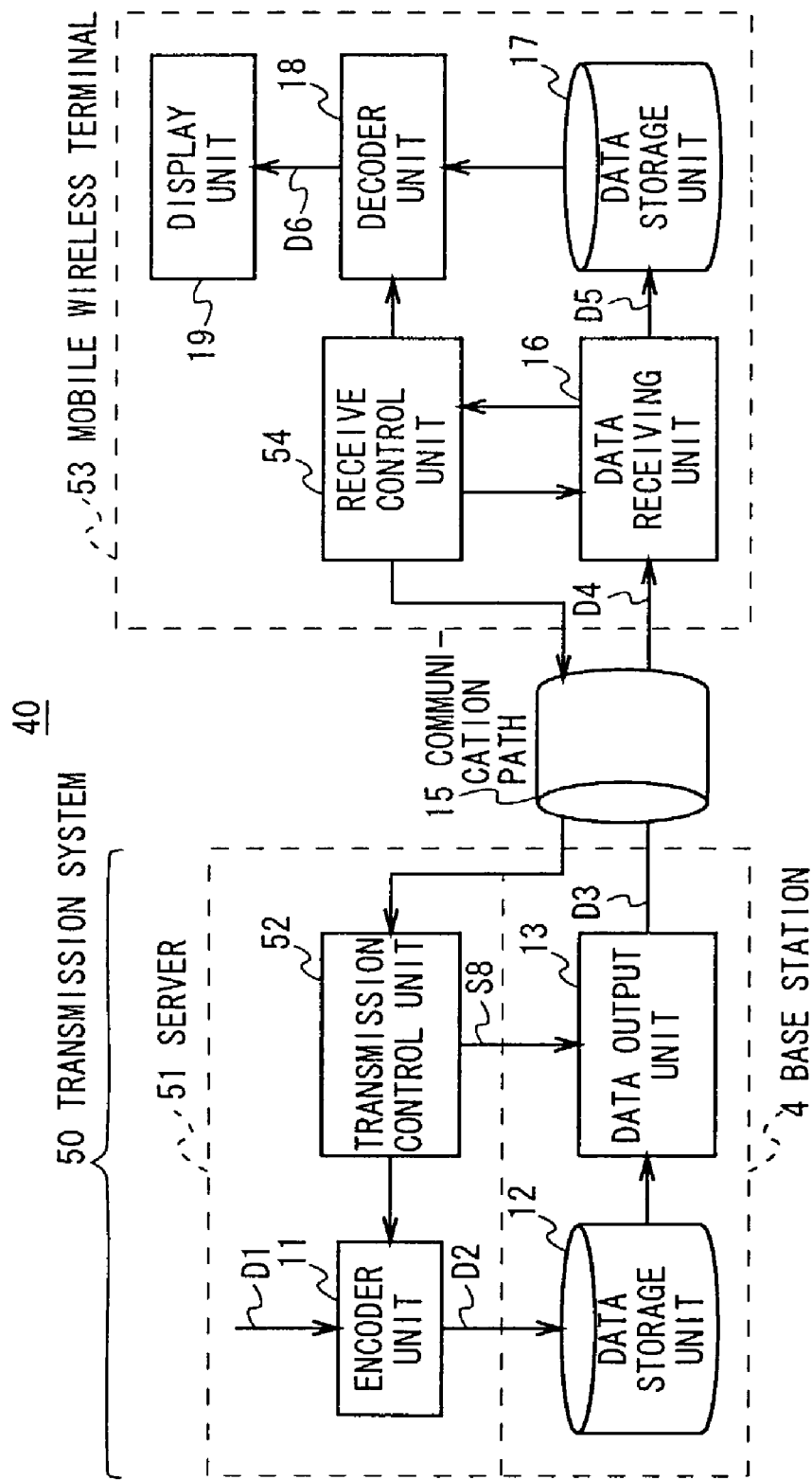
FIG. 10 is a brief linear block diagram showing the circuit construction of a wireless communication system according to the third embodiment.

As shown in FIG. 10, in which the corresponding parts of FIG. 2 are given the same reference numerals, the server 51 of the transmission system 50 enters the contents data D1 of contents (such as moving picture, still picture, text or sound)

to be transmitted into the encoder unit 11. And by compression encoding the contents data D1 at the predetermined compression rate specified by the transmission control unit 52, the server 51 forms the coded data D2 and supplies this to the data storage unit 12 of the base station 4.

The base station 4, after storing the coded data D2 supplied from the encoder unit 11 of the server 51 temporarily in the data storage unit 12, sends this out to the data output unit 13. The data output unit 13, adding error correction codes to the coded data D2, packetizes this and forms a transmission data D3 by modulating at the predetermined modulation system, and transmits this to the mobile wireless terminal 53 through the communication path 15.

The mobile wireless terminal 53 receives the transmission data D3 by the data receiving unit 16, and by conducting the demodulation processing and the error correction processing onto this as the receive data D4, obtains a demodulation data D5. And after storing this temporarily in the data storage unit 17, the mobile wireless terminal 53 sends this out to the decoder unit 18.

In this connection, the receiving control unit 54 monitors the volume of data storage to be stored in the data storage unit 17 from the data receiving unit 16, and it can inform the decoding timing to said decoder unit 18 when the volume of data that can be decoded is stored in the decoder unit 18.

The decoder unit 18 decodes the demodulation data D5 according to the notice of decoding timing from the receive control unit 54, and outputs the resulting decoded data D6 to the display unit 19. And by displaying the contents of data via said display unit 19, the decoder unit 18 makes the user view and hear this.

Then, the transmission control unit 52 of the server 51 is to transmit a retransmission control signal S8 to the data output unit 13 of the base station 4 corresponding to the type of contents required from the mobile wireless terminal 33. With this arrangement, it can control the number of packet retransmissions of the transmission data D3 to be transmitted from said data output unit 13.

In this connection, it becomes the premise that the data storage unit 12 of the base station 4 has the volume of data storage to the extent that the overflow would not occur even in the case of retransmitting the packet for the predetermined number of times in the data output unit 13.

Figure 11:
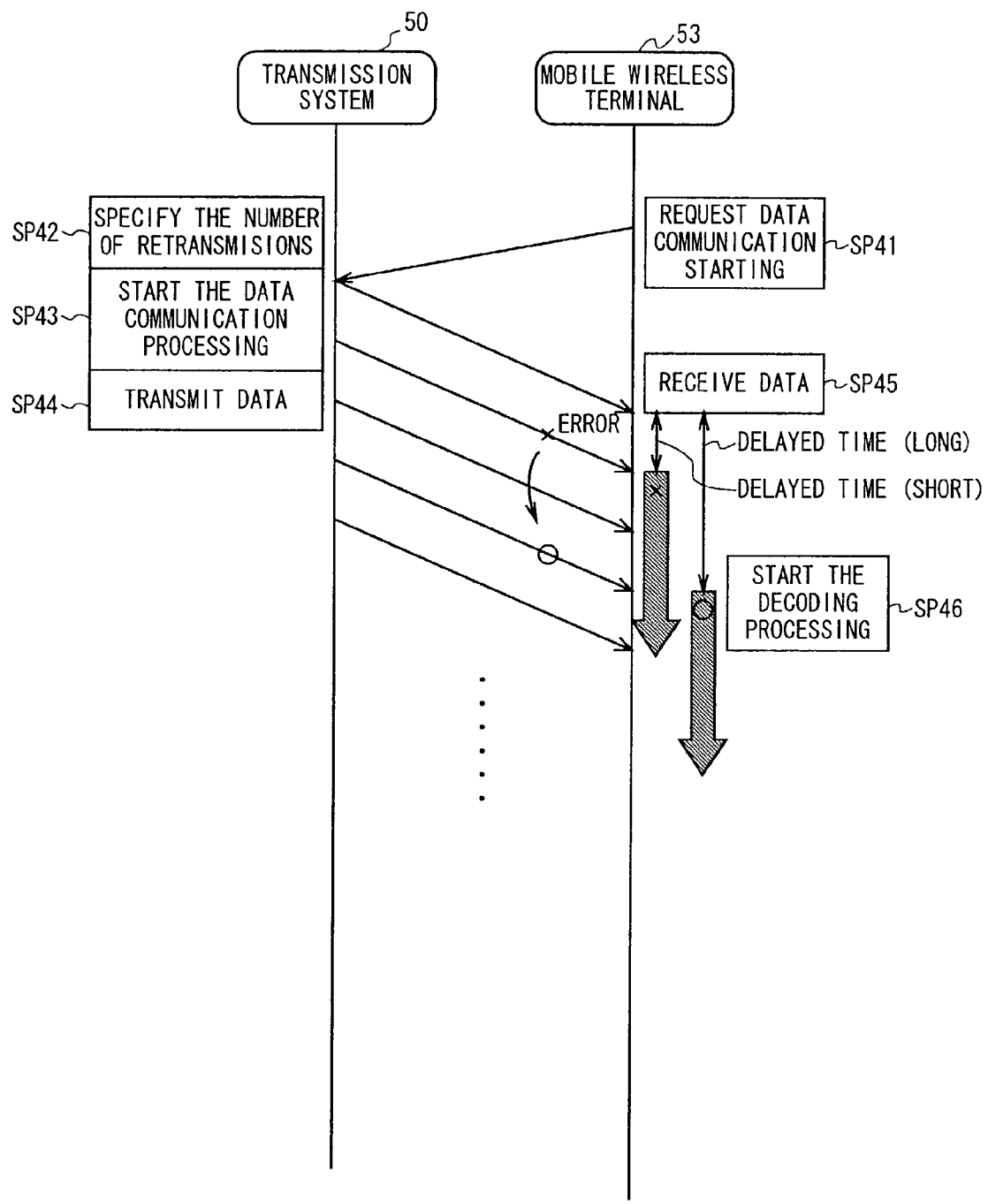
FIG. 11 is a flow chart showing the control processing procedure on the number of packet retransmissions corresponding to the type of contents.

(4-2) Processing Procedure of Controlling the Number of Packet Retransmissions Corresponding to the Type of Contents More specifically, the wireless communication system 40 executes the processing for controlling the number of packet retransmissions of the transmission data D3 to be transmitted from the data output unit 13 of the base station 4 between the transmission system 50 and the mobile wireless terminal 53 according to the procedure as shown in FIG. 11.

Firstly, at the step SP41, the mobile wireless terminal 53 requests the type of contents to the transmission control unit 52 in the server 51 of the transmission system 50 from the receive control unit 54.

At the step SP42, the transmission control unit 52 of the server 51, by outputting the retransmission control signal S8 corresponding to the type of contents specified to the data output unit 13 of the base station 4, sets the number of packet retransmissions in the data output unit 13 corresponding to the type of contents.

At the step SP43, the data output unit 13 of the base station 4, by reading out the coded data D2 from the data storage unit 12 and applying the modulation processing at the data output unit 13, starts the data communication processing, and moves to the following step SP44.

At the step SP44, the data output unit 13 of the base station 4 executes the data transmission, by repeatedly transmitting the packet of the transmission data D3 the number of packet retransmissions corresponding to the type of contents to be transmitted based on the retransmission control signal S8 specified by the transmission control unit 52 of the server 51.

Figure 12:
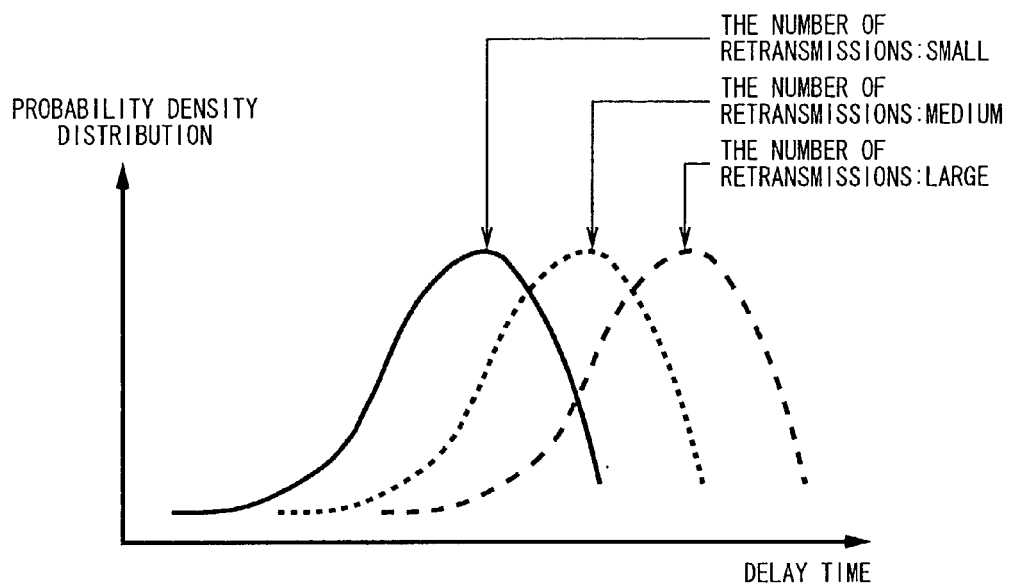
FIG. 12 is a characteristic curvilinear diagram showing the relationship between the number of packet retransmissions and the delay time.

At the step SP45, the data receiving unit 16 of the mobile wireless terminal 53 receives the transmission data D3. In that case, as shown in FIG. 12, it has a tendency that the more the number of packet retransmissions of the transmission data D3 becomes large, the delay time till the correct decoded data D6 will be obtained becomes longer, and as the number of packet retransmissions becomes smaller, the delay time becomes shorter.

Figure 13:
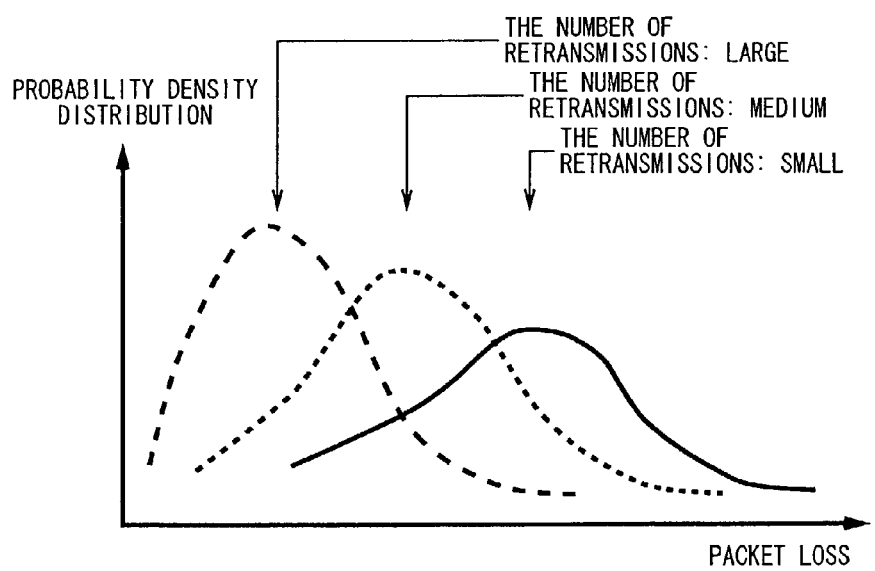
FIG. 13 is a characteristic curvilinear diagram showing the relationship between the number of packet retransmissions and the packet loss.

Furthermore, as shown in FIG. 13, it has a tendency that as the number of packet retransmissions of the transmission data D3 increases more, the packet loss decreases, and as the number of packet retransmissions becomes smaller, the packet loss increases.

Accordingly, the decoder unit 18 of the mobile wireless terminal 53 starts the decoding processing at the step SP46. At that time, when the number of packet transmissions is small, the delay time to get the decoding result is short. However, the probability that decoding error will occur is high since the number of packet retransmissions is small.

On the other hand, when the number of packet retransmissions is large, it takes longer delay time till the decoding result would be obtained. However, since the number of packet retransmissions is large, the probability that the decoding error will occur is low and the decoded data D6 can be certainly restored.

(4-3) Operation and Effects

According to the foregoing construction, the transmission control unit 52 of the server 51 controls the number of packet retransmissions of the transmission data to be transmitted from the data output unit 13 of the base station 4 corresponding to the type of contents (moving picture data, text data or audio data, etc.) requested from the mobile wireless terminal 53.

More specifically, the transmission control unit 52 of the server 51 sets the large number of packet retransmissions when the data communication with high reliability is required corresponding to the type of contents. On the other hand, in the case where the high speed communication having short delay time is required rather than its reliability, it sets fewer number of packet retransmissions. Thus, the optimum communication quality suited to the request of contents type specified from the mobile wireless terminal 53 can be assured.

According to the foregoing construction, since the wireless comunication system 20 controls the number of packet retransmissions by the data output unit 13 of the base station 4 corresponding to the type of contents by the transmission control unit 52 of the server 51, the communication quality best suited to the type of contents for the mobile wireless terminal 33 can be always guaranteed.

(5) Other Embodiments

The embodiments described above have dealt with the cases of controlling only the modulation system as the first embodiment, controlling only the buffer size as the second embodiment, and controlling only the number of retransmissions or the retransmission time as the third embodiment. However, the present invention is not only limited to these but also the modulation system and the buffer size may be combined and controlled, or the modulation system and the number of retransmissions or the retransmission time may be combined, or the buffer size and the number of retransmissions or the retransmission time may be combined and controlled, or the modulation system and the buffer size and the number of retransmissions or the retransmission time may be all combined and controlled.

Moreover, the second embodiment described above has dealt with the case of setting the volume of data storage (buffer size) of the data storage unit 12 and the data storage unit 17 corresponding to the type of contents requested from the mobile wireless terminal 33 as the receiver. However, the present invention is not only limited to this but also the volume of data storage (buffer size) may be set according to the data error rate of the receive data D4 feedbacked by the receive control unit 34 of the mobile wireless terminal 33.

Furthermore, the third embodiment described above has dealt with the case of controlling the number of packet retransmissions by the transmission control unit 52 of the server 51. However, the present invention is not only limited to this but also the number of packet retransmissions may be eventually controlled by adjusting the packet retransmission time required for packet retransmissions.

Furthermore, the first embodiment described above has dealt with the case of calculating the CIR at the data receiving unit 16. However, the present invention is not only limited to this but also the demodulation data D5 may be sent out to the receive control unit 54 and the CIR may be calculated at said receive control unit 54.

Furthermore, the first~the third embodiments described above have dealt with the cases of constituting servers 3, 31 and 51 by an encoder 11 and transmission control units 14, 32 and 52. However, the present invention is not only limited to this but also the transmission control units 14, 32 and 52 may be provided in the base station 4 or these may be provided in the supervisory base station that generally controls the base station 4 and other base stations.

Furthermore, the embodiment described above has dealt with the case of using mobile wireless terminals 8, 33 and 53 as the receivers. However, the present invention is not only limited to this but also various other receivers such as the PDA (Personal Digital Assistant) having wireless communication capability and the personal computer may be used.

According to the present invention as described above, a data communication quality control system, a transmission system and a receiver capable of executing the data transmission to the receiver from the transmission system by holding the predetermined communication quality according to the modulation system best suited to the type of data can be realized.

Furthermore, according to the present invention, since data can be read out by the receiver at the optimum read-out timing best suited to the type of data and can be decoded, a data communication quality control system, a transmission system and a receiver capable of executing the data transmission effectively not generating the underflow or overflow from the transmission system to the receiver holding the data communication quality suited to the type of data can be realized.

Moreover, according to the present invention, a data communication quality control system, a transmission system and a receiver capable of executing the data transmission from the transmission system to the receiver holding the predetermined data communication quality according to the number of data retransmissions best suited to the type of data can be obtained.

INDUSTRIAL UTILIZATION

The data communication quality control system, the transmission system and the receiver of the present invention can be suitable applied to the wireless communication system for controlling the communication quality in the case of transmitting contents from such as the server to the mobile wireless terminal via the base station.

The invention claimed is:

1. A data communication quality control system for controlling the data communication quality between a data transmission system to transmit data and a receiver to receive said data from said transmission system Through the predetermined communication path, wherein:
   said transmission system;
   controls said data communication quality between said transmission system and said receiver by changing the modulation system corresponding to the type of said data to be transmitted to said receiver, and
   wherein the transmission system adjusts the volume of the transmitting side data storage to be buffered temporarily in the case of transmitting the data to the receiver corresponding to the type of data to be transmitted to the receiver, and
   wherein the receiver is operable to effect a change in the transmitter side data storage volume and control the data communication quality between the transmission system and the receiver by adjusting the receiving side data storage volume to the same data storage volume as the transmitting side data storage volume.

2. The data communication quality control system according to claim 1, wherein:
   said transmission system;
   uses the modulation system that can be transmitted at the high transmission speed in the case where the high reliability of said data is not required corresponding to said data type; and
   uses the modulation system that can be transmitted at the low transmission speed in the case where the high reliability of said data is required corresponding to said data type.

3. A transmission system for transmitting data responding to the request of the receiver to said receiver, comprising:
   system side receiving means for receiving a request from said receiver;
   system side transmission means for transmitting said data to said receiver; and
   control means for controlling the data communication quality between said transmission system and said receiver by changing the modulation system corresponding to the data type suited to said request,
   wherein the transmission system adjusts the volume of the transmitting side data storage to be buffered temporarily in the case of transmitting the data to the receiver corresponding to the type of data to be transmitted to the receiver, and
   wherein the receiver is operable to effect a change in the transmitter side data storage volume and control the data communication quality between the transmission system and the receiver by adjusting the receiving side data storage volume to the same data storage volume as the transmitting side data storage volume.

4. The transmission system according to claim 3, wherein:
said control means;
    uses the modulation system that can be transmitted at the high transmission speed in the case where the high reliability of data corresponding to the type of said data is not needed; and
    uses the modulation system that can be transmitted at the low transmission speed in the case where the high reliability of data corresponding to the type of said data is required.

5. A receiver for receiving the data requested from the transmission,system, comprising;
    receiver side transmission means for transmitting said request to the transmission system; and
    receiver side receiving means for receiving said data of which the data communication quality between said transmission system and said receiver is controlled by changing the modulation system corresponding to the type of said data,
    wherein the transmission system adjusts the volume of the transmission system data storage to be buffered temporarily in the case of transmitting the data to the receiver corresponding to the type of data to be transmitted to the receiver, and
    wherein the receiver is operable to effect a change in the transmitter side data storage volume and control the data communication quality between the transmission system and the receiver by adjusting the receiving side data storage volume to the same data storage volume as the transmitting side data storage volume.

6. The receiver according to claim 5, wherein:
said receiver side receiving means;
    in the case where the high reliability of said data is not required for the type of data requested, it receives said data using the modulation system transmittable at the high transmission speed; and
    in the case where the high reliability of said data is required for the type of data requested, it receives said data using the modulation system transmittable at the low transmission speed.

7. A data communication quality control system comprising:
    a data transmission system to transmit data and having transmitting side data storage;
    a receiver to receive data and having receiving side data storage,
    wherein the transmission system adjusts the volume of the transmitting side data storage to be buffered temporarily in the case of transmitting the data to the receiver corresponding to the type of data to be transmitted to the receiver, and
    wherein the receiver is operable to effect a change in the transmitter side data storage volume and control the data communication quality between the transmission system and the receiver by adjusting the receiving side data storage volume to the same data storage volume as the transmitting side data storage volume.

* * * * *